US008340477B2

(12) United States Patent  
Foss et al.

(10) Patent No.: US 8,340,477 B2  
(45) Date of Patent: Dec. 25, 2012

(54) DEVICE WITH AUTOMATIC IMAGE CAPTURE

(75) Inventors: Ben Foss, San Francisco, CA (US); Leyla Najafi, Granite Bay, CA (US); David Poisner, Carmichael, CA (US); Gretchen Anderson, San Francisco, CA (US); Jeff Witt, Baltimore, MD (US); Daniel Senatore, San Francisco, CA (US); Matthew Peterson, San Francisco, CA (US); Travis Lee, San Francisco, CA (US)

(73) Assignee: Intel Corporation, Santa Clara, CA (US)

( * ) Notice: Subject to any disclaimer, the term of this patent is extended or adjusted under 35 U.S.C. 154(b) by 1273 days.

(21) Appl. No.: 12/059,294

(22) Filed: Mar. 31, 2008

(65) Prior Publication Data

US 2009/0245695 A1 Oct. 1, 2009

(51) Int. Cl.  
*G06K 9/20* (2006.01)

(52) U.S. Cl. ........ 382/317; 382/314; 382/321; 358/537; 358/449

(58) Field of Classification Search .................. 382/314, 382/315, 317, 321; 358/537, 449, 425  
See application file for complete search history.

(56) References Cited

U.S. PATENT DOCUMENTS

| | | | | |
|---|---|---|---|---|
| 5,555,099 A * | 9/1996 | Telle | ............................. | 358/401 |
| 6,307,981 B1 * | 10/2001 | Kamei et al. | .................. | 382/309 |
| 6,434,276 B2 * | 8/2002 | Hirosawa et al. | ............. | 382/284 |
| 6,529,809 B1 * | 3/2003 | Breed et al. | ...................... | 701/45 |
| 6,567,126 B1 * | 5/2003 | Slatter et al. | .................. | 348/345 |
| 6,614,914 B1 * | 9/2003 | Rhoads et al. | ................ | 382/100 |
| 6,643,035 B1 * | 11/2003 | Salgado | ........................ | 358/474 |
| 6,725,101 B2 * | 4/2004 | Sanchez et al. | ................. | 700/45 |
| 6,874,420 B2 * | 4/2005 | Lewis et al. | ................... | 101/485 |
| 6,975,418 B1 * | 12/2005 | Ohta et al. | .................... | 358/1.15 |
| 6,982,811 B2 * | 1/2006 | Sato | ............................... | 358/1.4 |
| 7,287,253 B2 * | 10/2007 | Yamamura et al. | ........... | 717/176 |
| 7,359,535 B2 * | 4/2008 | Salla et al. | .................... | 382/128 |
| 7,389,299 B2 * | 6/2008 | Boguraev et al. | ..................... | 1/1 |
| 7,540,581 B2 * | 6/2009 | Someno | ........................ | 347/19 |
| 7,827,223 B2 * | 11/2010 | Gressel et al. | ................ | 708/250 |
| 7,847,835 B2 * | 12/2010 | Sim et al. | ................... | 348/231.4 |
| 7,885,981 B2 * | 2/2011 | Kaufman et al. | ............. | 707/802 |
| 7,937,470 B2 * | 5/2011 | Curley et al. | ................. | 709/226 |

* cited by examiner

*Primary Examiner* — Yosef Kassa  
(74) *Attorney, Agent, or Firm* — Schwabe, Williamson & Wyatt, P.C.

(57) ABSTRACT

In some embodiments, provided are methods and reading devices with image capture capabilities for efficiently capturing multiple images.

18 Claims, 5 Drawing Sheets

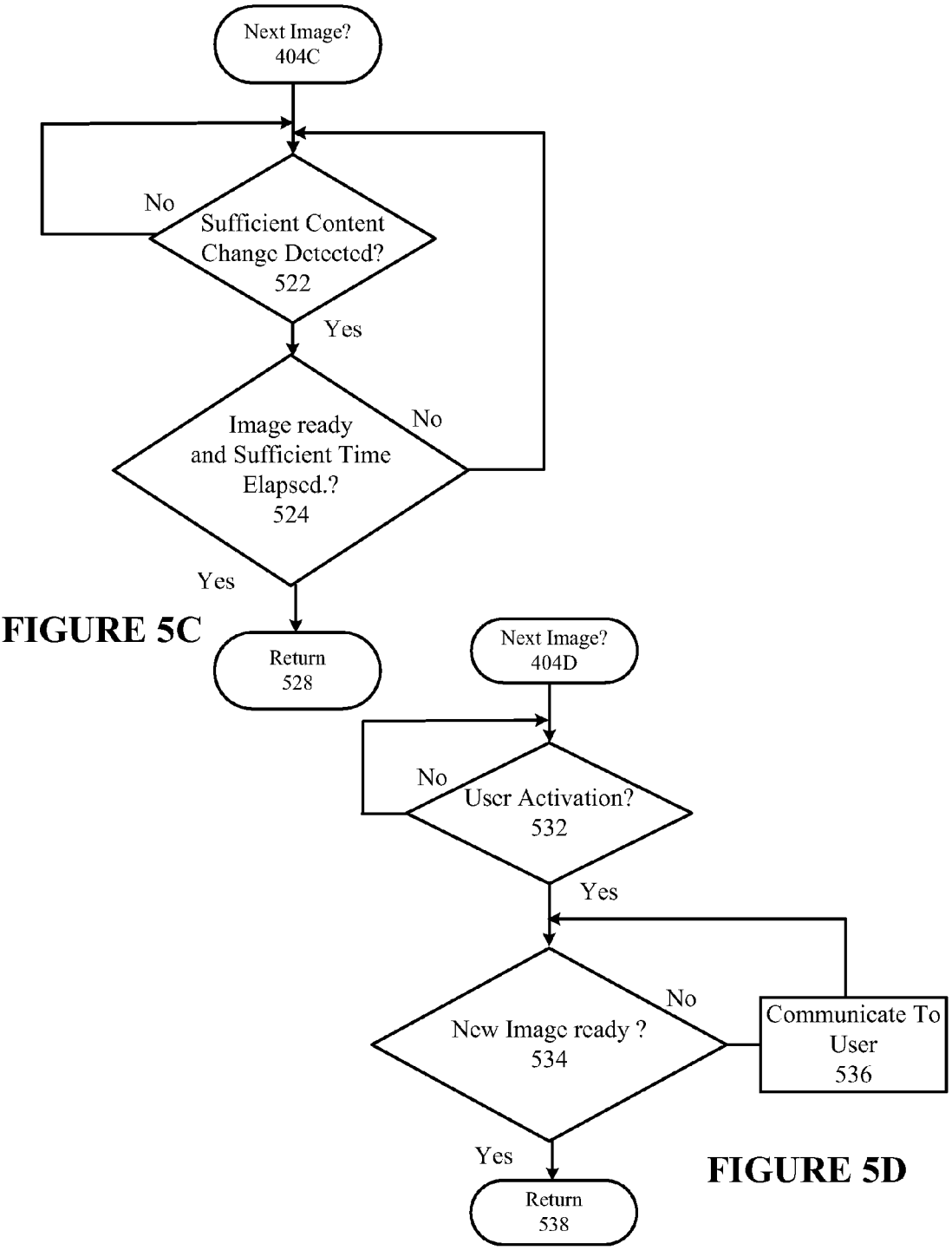

DEVICE WITH AUTOMATIC IMAGE CAPTURE

BACKGROUND

The embodiments of the invention relate to a reading machine for print or reading impaired persons such as individuals who are visually impaired or have dyslexia.

People with disabilities, such as impaired vision or dyslexia, may have difficulty reading visually perceivable material. Automatic systems are needed to render images as audio information.

It is known to provide a mobile print digitizer for the visually impaired. For example, one known device captures printed images and reads them to the user. A camera or scanner may capture an image, e.g., a text-containing image from a printed page, and then run optical character recognition (OCR) on the image. The output is fed to a speech synthesizer such as a text-to-speech system (TTS), fed through a speaker or headphones and conveyed to the user. Unfortunately, however, there can be problems associated with the use of such readers. For example, it can be cumbersome for users to scan a large number of images from a source to be read such as when a book is to be scanned and read. Accordingly, new approaches for more convenient multiple-image capturing may be desired.

BRIEF DESCRIPTION OF THE DRAWINGS

Embodiments of the invention are illustrated by way of example, and not by way of limitation, in the figures of the accompanying drawings in which like reference numerals refer to similar elements.

FIG. 5C is a flow diagram showing a routine for determining when to capture a next image, suitable for use in the routine of FIG. 4, in accordance with yet other embodiments.

FIG. 5D is a flow diagram showing a routine for determining when to capture a next image, suitable for use in the routine of FIG. 4, in accordance with still other embodiments.

DETAILED DESCRIPTION

Figure 1:
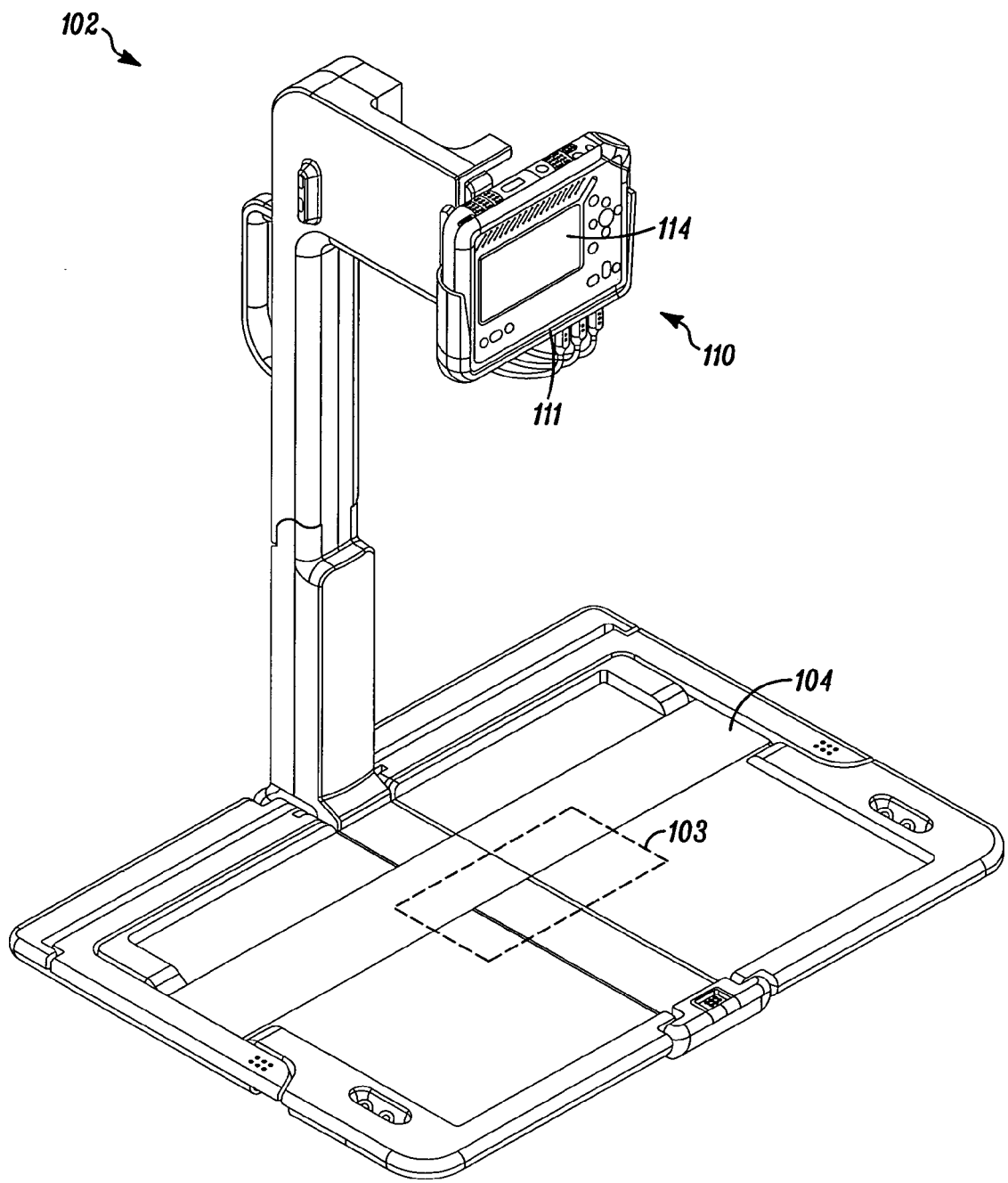
FIG. 1 is a perspective view of a reading device in accordance with some embodiments.

FIG. 1 shows a reading device 110 removably mounted in a portable capture station 102. (As used herein, "reading" means to convey, provide, or otherwise make available information, e.g., text or object information, in an audio form to a user.) The reading device has an aperture (or opening) at 111 to capture one or more images from an image source (e.g., book, not shown) in an image area 103. (Note that the one or more images may come from any suitable source having text to be read by a user. For example, the one or more images could come from a book, magazine, article, aggregation of documents, or the like.) Among other things, the depicted stand 102 has a transparent panel 104 such as a glass sheet with a lever to press down over an image to be captured. This may be helpful for images in text sources such as bound books having sheets that might otherwise naturally lay in a way (e.g., not pressed sufficiently downwardly) so that surfaces to be captured are not amenable for two-dimensional scanning due to different portions having different focus requirements.

The reading device 110 has a user interface comprising a display 114 along with sensors, transducers, and/or other instruments to allow a user to control the device to scan (capture) the one or more images from the text source in the image area 103. For example, the reading device 110 has buttons to allow a user to initiate a bulk capture operational mode to capture multiple images in a convenient manner for the user. When in this mode, a user may press a button on the station, on the reading device itself, or initiate a next image to be captured in some other way such as through an initiated sound or gesture (e.g., wave of the hand over the image area). Other more automated techniques may also be employed. For example, the device may be made to automatically initiate an image capture, e.g., in a closed-loop fashion when a new (next) image is recognized relative to a previous image, or in an open-loop fashion such as by using a timer or the like.

Figure 2:
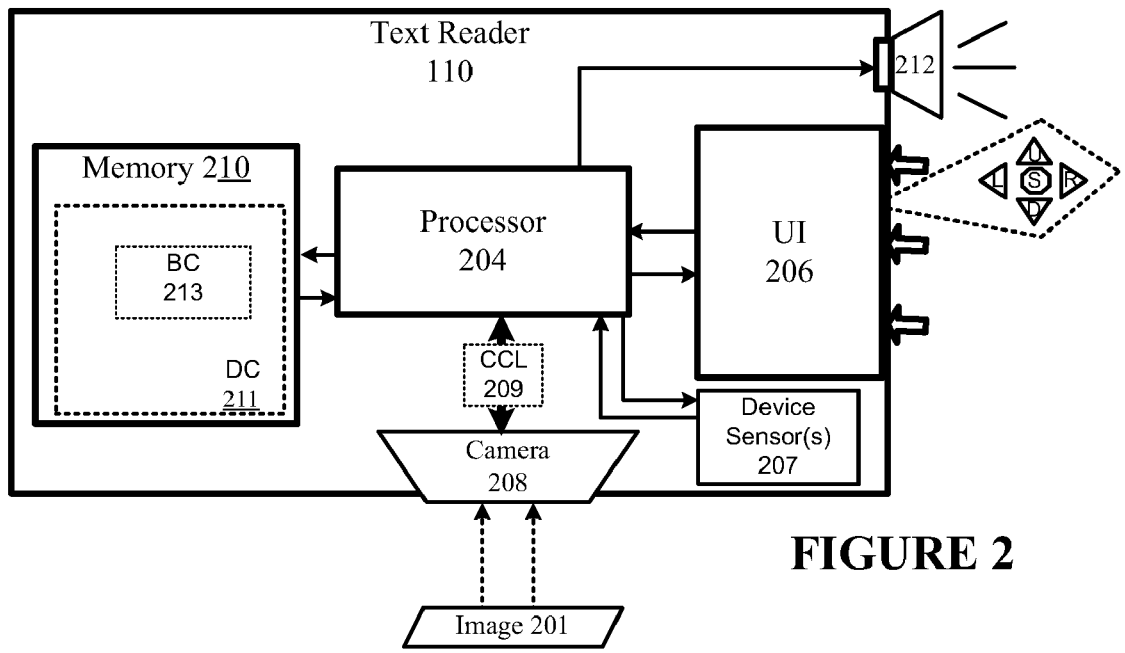
FIG. 2 is a block diagram of a reading device in accordance with some embodiments.

FIG. 2 shows a block diagram of a reading apparatus 110 to scan an image 201 from a multiplicity of images to be read to the user in accordance with some embodiments. Reader 110 generally comprises a processor 204, user interface 206, camera 208, camera control logic (CCL) 209, memory 210, and an auditory output device 212, coupled together as shown.

The camera may comprise any suitable device such as a charge coupled device (CCD) camera to acquire a raster image of a text image 201, as is known in the art. It may be able to scan an image line by line, section by section or it may image an entire page or sheet at once. The auditory device 212 could comprise any suitable device to auditorily convey the read text to the user. For example, it could comprise one or more speakers and/or audio interface ports for connection to headphones or the like.

The user interface 206 may constitute any suitable components, known or not yet developed, to allow a user to conveniently control the reader. For example, the user interface could comprise one or more buttons, wheels, joysticks or other input control components that allow a user to manually control the reader without necessarily being able to see the user interface (i.e., it should allow a user to control at least some of the components without having to see them, e.g., by feeling them). In some embodiments, for example, the user interface could include five buttons, such as that shown in FIG. 2, with up ("U"), down ("D"), left ("L"), right ("R"), and select ("S") buttons, to allow a user to conveniently navigate through a menu structure to select a desired capture mode. Alternatively, a separate button for this, or any other, specific mode could be used.

The user interface could also include input ports (which may also function as output ports) such as universal serial bus (USB), so-called "Firewire", and/or wireless ports, e.g., to allow a user to import an electronic image that may or may not be in a text format. In addition, the user interface could include speech-to-text capability, e.g., a microphone with suitable speech-to-text engine, and other input control actuators and/or sensors to allow a user to control image capture, as well as other reader operations. Of course, as with any feature, especially those requiring substantial hardware and/or processing, trade-offs must be made between cost, power consumption, operating efficiency, performance accuracy, and feature capability.

The processor 204, CCL 209, and memory 210 may comprise any suitable combination of memory and processing circuits, components, or combinations of the same to implement processing engines to control the reader 110. For example, the memory could comprise read only memory (ROM) components, random access memory (RAM) components and non-volatile RAM such as flash memory or one or more hard drive devices. In some embodiments, CCL (camera control logic) employing separate processing logic, e.g., using a programmable logic device, separate from the processor 204 may be used to provide increased processing capability to control the camera and to appropriately transfer captured images to the processor. It may also function or assist in providing viewed images or image portions to the processor, e.g., in furtherance of a multiple image (or bulk) capture routine to determine if an image is ready.

The memory 210 comprises device control (DC) software code 211 to control the reader 110 and execute its various functions such as text-to-speech (TTS), optical character recognition (OCR), characterization, reading navigation, system functionality, user interface control, and the like. With relevance to this disclosure, it also may comprise a bulk capture (BC) module 213 for controlling the capture of multiple images, as discussed herein. (It should be appreciated that the BC functionality may be performed via software, by processor 204 and/or by another processor, or it may be performed in whole or in part using separate logic such as CCL 209. In addition, there may be more modules and in some embodiments, the modules may not necessarily inter-relate with each other as shown.)

Figure 3:
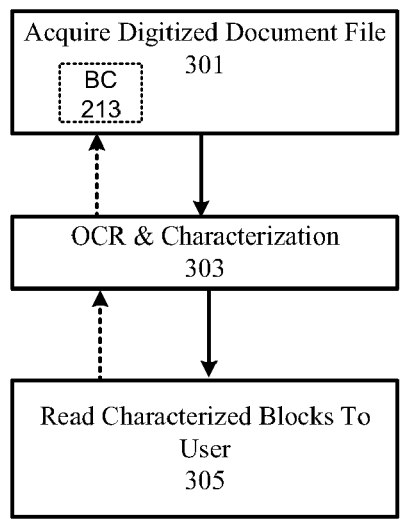
FIG. 3 is a flow diagram of a routine for operating a reading device in accordance with some embodiments.

FIG. 3 shows a routine for implementing a reader such as the reader 110 of FIGS. 1 and 2. For example, this routine could be administered through the DC module 211. (Note that in some embodiments, conventional software modules may be used to implement one or more of the different functions executed and/or overseen through the DC module 211. For example, there are many suitable off-the-shelf OCR and TTS modules that may be used, e.g., in cooperation with code specifically written for a given reader device. That is, modules could be developed and/or configured, wholly or partly, from existing "off-the-shelf" products.)

At 301, a digitized image with text to be read is acquired. In general, this may be done either through the camera 208 or by way of file transfer into the device. However, with particular relevance to this disclosure, it encompasses scanning multiple images through the camera 208 using a bulk capture capability (213) as discussed herein. The multiple images scanned and acquired by the device will typically be combined into one or several aggregate files corresponding to the text source(s), e.g., book, from which the acquired images were scanned.

The aggregate file(s) should be in a suitable form for the other implemented modules such as OCR. For example, many OCR packages typically accept raster image formats commonly found throughout the document management industry such as TIF, BMP, PCX and DCX, to mention just a few. Depending upon particular design considerations, a suitable OCR solution may be used to accept input from other sources such as fax input formats, PDF (or similar) formats, or common scanner driver formats such as TWAIN and ISIS.

At 303, optical character recognition (OCR) is performed on the acquired image file. Any suitable OCR tool (or module), presently available or specifically developed may be employed. Finally, at 305, the OCR'd text is read to the user. As with OCR, any suitable text-to-speech (TTS) solution may be used.

(Note that the dotted arrows in the flow diagram are meant to indicate that the depicted block processes do not necessarily occur sequentially. That is, they may be running concurrently with each other and be affected by characterizations, identifications, and OCR'ing that has already occurred. They also may affect how each other processes its tasks and certainly can affect how OCR'ing and even digitized image acquisition should be occurring. For example, images may be received by the camera and analyzed by the DC and/or CCL while the DC (OCR, etc.) is working on previously acquired images or on a portion, e.g., in an accelerated, lower resolution manner to identify information in a current image.)

Figure 4:
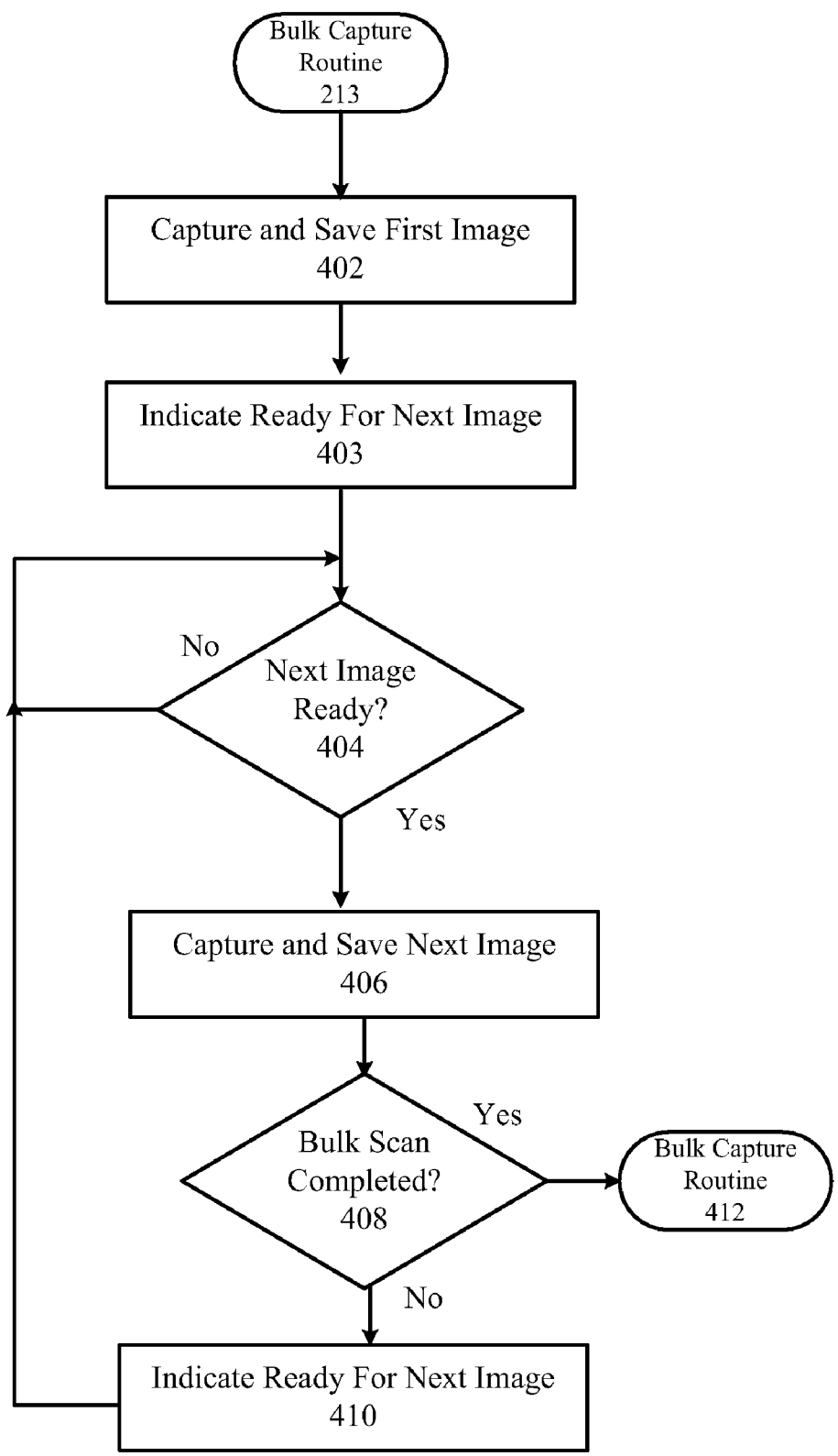
FIG. 4 is a flow diagram showing a routine for capturing multiple images in accordance with some embodiments.

With reference to FIG. 4, a bulk capture (or multiple image capture) routine 218 in accordance with some embodiments is shown. This may be initiated in any way. For example, it could be in response to a user pressing a button on the reader 110 or selecting a bulk capture image capture mode from a set of or menu of options. It could be done directly from the reader or remotely from a wireless control device or from a button on the portable stand. The user might also select a desired type of bulk capture to be performed. As will be discussed below, this disclosure encompasses different techniques and technique combinations for performing bulk image capture. (Note also that this and other routines disclosed herein may be performed by the reader of FIGS. 1 and 2 or by other reader embodiments. Typically, however, they will work best when the reader device is mounted in a stand such as the stand of FIG. 1, but they could also be implemented in other schemes such as when a user is holding the reading device, e.g., over the image source.)

At 402, it controls the camera 208 and CCL 209 (if used) to capture a first image from the multiple images to be scanned and acquired. In doing this, it will likely first ensure that the first image is ready, e.g., stable and in suitable focus. It may convey a message to a user if it does not perceive an image ready for capture, e.g., in a sufficient amount of time from when the routine was initiated.

Next, at 403, it indicates (e.g., to a user) that it is ready to scan/acquire the next image. This could be done in any suitable way such as through a sound (e.g., beep), or spoken command ("next page ready"), etc.

At 404, it determines if conditions are satisfied for the next image to be scanned. If not, it waits for them to be ready. As discussed with respect to FIGS. 5A to 5D, there may be several different ways to perform this determination, and they may or may not actively involve the device doing more than simply waiting for the next image to be ready. When it determines that the next image is ready, then it proceeds to 406 and captures and saves the next image. From here, it goes to 408 and determines if all of the images have been captured or if the bulk capture task is otherwise finished. If so, then the routine ends at 412. Otherwise, it goes to 410, indicates that it is ready for the next image, and returns back to 404 and continues as described.

FIGS. 5A to 5D show different exemplary ways to perform step 404, where the routine determines if a next page is ready. the first approach (FIG. 5A) uses page numbering (or the like); the second approach (FIG. 5B) uses motion detection; the third approach (FIG. 5C) uses change in content; and the fourth approach (FIG. 5D) uses user activation.

Figure 5A:
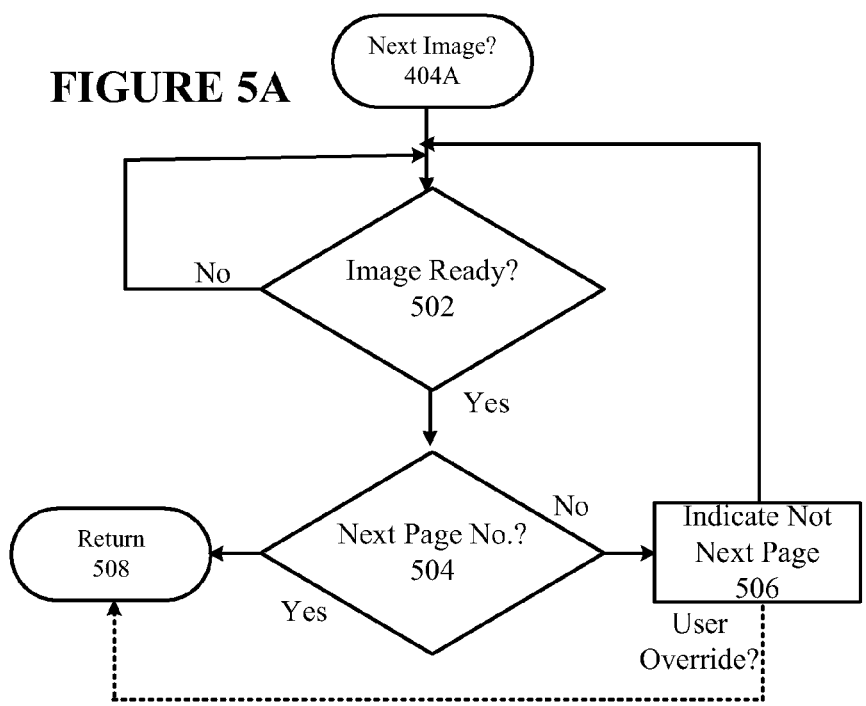
FIG. 5A is a flow diagram showing a routine for determining when to capture a next image, suitable for use in the routine of FIG. 4, in accordance with some embodiments.

With reference to FIG. 5A, a routine 404A for determining if a next image is ready for capture using page identifiers is shown. At 502, it checks to see if an image is present and ready, i.e., suitable for scanning, stable and suitably in focus. If not, it loops back to itself, essentially waiting and checking until it determines that an image is ready. In some embodiments, it may take more proactive measures, e.g., notifying a user that the image is not sufficiently flat or not wholly within the image area) while waiting/checking.

If an image is ready, then at 504, it determines if the image is the next page by identifying its page; number and determining if it is the next page in a sequence. To do this, it will likely initiate at least a partial scan and OCR to find a page number. This could use different parameters such as lower scan resolution and/or OCR acuity to speed up the process since it needs only to find a page number. In some embodiments, it may identify characteristics about page numbering, e.g., size, location, format, from the first one or several images and use this information for subsequent images to more efficiently identify their page numbers. Note, also, that it may scan more than one page at a time such as may be the case when a book is laid open with adjacent pages facing up toward the camera. In this case, it may scan both pages as an image and look for both page numbers or at least track them if not every page is numbered.

If at 504, it determines that the next page is present, then it returns back to the routine of FIG. 4 and captures the image. Otherwise, it goes to 506 and indicates that the next page is not present. It may identify the detected page, if detected, or simply report that the next page is not detected. It then loops back to 502 and confirms./waits for the correct next page. In some embodiments, it may provide the user with an option to override its determination that the image is not the next page and if the user so instructs the routine, it proceeds to 508 and returns back to the routine of FIG. 4. This may be helpful, for example, where a user desires to scan intermittent sections within a book.

Figure 5B:
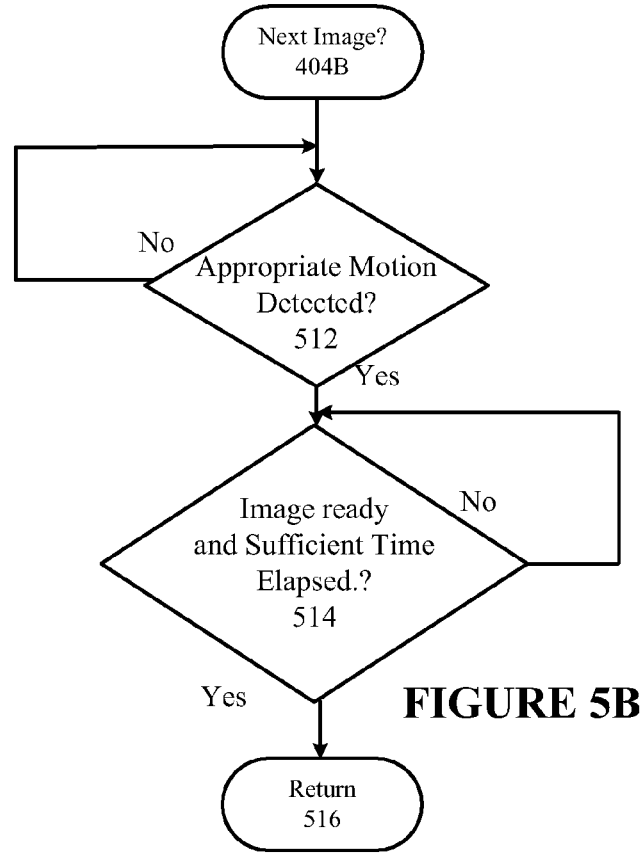
FIG. 5B is a flow diagram showing a routine for determining when to capture a next image, suitable for use in the routine of FIG. 4, in accordance with other embodiments.

FIG. 5B shows a routine 404B for determining if a next image is ready using motion detection. At 512, it looks for appropriate motion detection and loops back to itself if motion is not detected. Thus, it essentially waits until it detects appropriate motion. As used herein, "appropriate motion" refers to motion, either from a user (e.g., wave of hand over image area) or from something else (such as motion of the image, e.g., when a page is turned) as predefined by a designer or set by a user.

When the appropriate motion has been detected, then the routine proceeds to 514 and determines if an image is present and ready. In addition, with this embodiment, it also determines if sufficient time has elapsed since the motion was detected. This time requirement may be helpful if the motion of a page changing is being used. On the other hand, it may not be desired if a hand wave (or similar) is employed, i.e., presumably, a user would make the gesture after the next page has been positioned.

During this step, the routine may also incorporate aspects of the routine of FIG. 5A, i.e., confirm that a suitable next image is present. Once these requisites have been confirmed, it goes to 516 and returns back to the routine of FIG. 4.

FIG. 5C shows another embodiment of a routine for determining if a next image is ready. In this routine, the routine uses content change to determine that the image has changed. Initially, at 522, it determines if sufficient content change has occurred. It may initiate a partial scan or a scan with decreased resolution and similarly, initiate a more streamlined OCR to characterize the content of an image and then compare it against the previous image to assess whether or not the image has changed. As can be seen, this is a generalization of the page number approach used in FIG. 5A. (Note that any suitable image processing algorithms can be used when comparing images. Such algorithms include but are not limited to Fourier, wavelet, reduced resolution, and hybrid methodologies. They, for example, may be incorporated to reduce problematic sensitivity to an image unintentionally moving, e.g., from a "bump" or vibration.)

If the page content is determined to be sufficiently different (indicating that a new image is at the image area), then the routine goes to 524 to determine if the image is ready for capture. It may also confirm that sufficient time has elapsed since it determined that a new image is present.

In determining whether the image is ready, it may evaluate the content of the image to confirm that it is the "next" image. As with the above approach, it could notify a user and allow them to override the detection of an "out-of-order" image or wait for a proper "next" image to be placed on the image area. It loops back to itself if the image is not ready, i.e., it waits and monitors the predefined conditions that make it ready until it is ready. Once it determines that the image is ready, it goes to 528 and returns back to the routine of FIG. 4 for the image to be captured.

FIG. 5D shows yet another routine for determining if a next image is present and ready. At 532, it determines if a user has activated (or initiated) image capture for a next image. It loops back on itself if not, which is another way of saying that it monitors user input to look for a next page activation from the user. (This step is actually a generalization of the motion detection approach discussed above when the motion is being caused by a user.) User activation can occur in any suitable way. For example, it could come from a button on the station more proximal to the user, it could come from voice activation (by way of a microphone), it could come from a distinct sound such as a tap or clap, or it could come from some other type of gesture interface. In some embodiments, a gesture could also allow for single-page capture, or read when a book is opened. Other approaches could be incorporated. For example, tapping the bottom of one page twice could initiate a capture and for only that page to be read. The gesture (e.g., tap) interface could also facilitate convenient flexibility, for example, the skipping of full-page ads in magazines.

Once it detects such activation, it goes to 534 to determine if a new image is ready. If not, it goes to 536 to communicate this to a user and then returns back to 534. (Alternatively, in response to user override, it could go to 538 and return back to the routine of FIG. 4. Regardless, when it determines that a new (and possibly correct) image is ready, it goes to 538 and returns back to the routine of FIG. 4.

In the preceding description, numerous specific details have been set forth. However, it is understood that embodiments of the invention may be practiced without these specific details. In other instances, well-known circuits, structures and techniques may have not been shown in detail in order not to obscure an understanding of the description. With this in mind, references to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

The invention is not limited to the embodiments described, but can be practiced with modification and alteration within the spirit and scope of the appended claims.

It should be appreciated that example sizes/models/values/ranges may have been given, although the present invention is not limited to the same. As manufacturing techniques (e.g., photolithography) mature over time, it is expected that devices of smaller size could be manufactured. Further, arrangements may be shown in block diagram form in order to avoid obscuring the invention, and also in view of the fact that specifics with respect to implementation of such block diagram arrangements are highly dependent upon the platform within which the present invention is to be implemented, i.e., such specifics should be well within purview of one skilled in the art. Where specific details (e.g., circuits) are set forth in order to describe example embodiments of the invention, it should be apparent to one skilled in the art that the invention can be practiced without, or with variation of, these specific details. The description is thus to be regarded as illustrative instead of limiting.

What is claimed is:

1. An apparatus, comprising:
 a reading device with logic configured to cause the reading device to:
  monitor an image area for an image;
  determine whether the image is different from a previous image in the image area; and
  cause the image to be captured based at least in part on a result of determination whether the image is different from the previous image.

2. The apparatus of claim 1, wherein the logic is configured to cause the reading device to determine whether the image is different through determination of whether the image has sufficiently different content from the previous image.

3. The apparatus of claim 2, wherein determination of whether the image has sufficiently different content from the previous image comprises determination of whether the image has a page number that is in a proper sequence relative to the previous image.

4. The apparatus of claim 3, wherein determination of whether the image has sufficiently different content from the previous image further comprises determination, in response to a user override, that the image has sufficiently different content regardless of whether the page number is in a proper sequence.

5. An apparatus, comprising:
 a reading device with logic configured to cause the reading device to:
  monitor an image area for an image;
  determine if the image is ready to be captured; and
  cause the image to be captured based at least in part on a result of a determination of whether appropriate motion has occurred above the image area.

6. The apparatus of claim 5, in which the appropriate motion comprises a user's hand gesture.

7. The apparatus of claim 5, wherein the logic is further configured to cause the reading device to wait a period of time from the determination that appropriate motion has occurred until capturing the image.

8. The apparatus of claim 7, in which the period of time is set by the user.

9. The apparatus of claim 7, in which the period of time is determined by the reader device.

10. A method, comprising:
 monitoring, by a reading device, an image area for an image;
 determining, by the reading device, whether the image is different from a previous image in the image area; and
 causing, by the reading device, the image to be captured based at least in part on a result of determination whether the image is different from the previous image.

11. The method of claim 10, in which determining if the image is different from the previous image comprises determining whether the image has sufficiently different content from the previous image.

12. The method of claim 11, in which determining if the image has sufficiently different content comprises determining whether the image has a page number that is in a proper sequence relative to the previous image.

13. The method of claim 12, wherein determining whether the image has sufficiently different content from the previous image further comprises determining, in response to a user override, that the image has sufficiently different content regardless of whether the page number is not in a proper sequence.

14. A method, comprising:
 monitoring, by a reading device, an image area for an image;
 determining, by the reading device, whether the image is different from a previous image in the image area; and
 causing, by the reading device, the image to be captured based at least in part on a result of determination of whether appropriate motion has occurred above the image area.

15. The method of claim 14, in which the appropriate motion comprises a user's hand gesture.

16. The method of claim 14, further comprising waiting, by the reading device, a period of time from the determination that appropriate motion has occurred until capturing the image.

17. The method of claim 16, in which the period of time is set by the user.

18. The method of claim 16, in which the period of time is determined by the reader device.

* * * * *